(12) United States Patent
Bandera et al.

(10) Patent No.: US 9,045,219 B2
(45) Date of Patent: Jun. 2, 2015

(54) HAND CONTROLLER ASSEMBLY

(75) Inventors: Pablo Bandera, Goodyear, AZ (US); Paul Buchele, Glendale, AZ (US)

(73) Assignee: HONEYWELL INTERNATIONAL, INC., Morristown, NJ (US)

( * ) Notice: Subject to any disclaimer, the term of this patent is extended or adjusted under 35 U.S.C. 154(b) by 1908 days.

(21) Appl. No.: 12/141,601

(22) Filed: Jun. 18, 2008

(65) Prior Publication Data
US 2009/0319097 A1  Dec. 24, 2009

(51) Int. Cl.
*B64C 13/04* (2006.01)
*G05D 1/00* (2006.01)
*G05D 9/00* (2006.01)
*H01H 25/00* (2006.01)
*G05G 9/047* (2006.01)

(52) U.S. Cl.
CPC ............. *B64C 13/04* (2013.01); *G05G 9/047* (2013.01); *G05G 9/04792* (2013.01); *G05G 2009/04718* (2013.01)

(58) Field of Classification Search
USPC .......... 701/3; 74/523, 491; 345/161; 244/237
See application file for complete search history.

(56) References Cited

U.S. PATENT DOCUMENTS

| | | | |
|---|---|---|---|
| 3,628,394 A | 12/1971 | Keatinge et al. | |
| 3,771,037 A | 11/1973 | Bailey | |
| 4,012,014 A | 3/1977 | Marshall | |
| 4,348,142 A | 9/1982 | Figour | |
| 4,531,080 A | 7/1985 | Nordstrom et al. | |
| 4,555,960 A | 12/1985 | King | |
| 4,580,006 A | 4/1986 | Hull | |
| 4,584,510 A | 4/1986 | Hollow | |
| 4,589,810 A | 5/1986 | Heindl et al. | |
| 4,738,417 A | 4/1988 | Wenger | |
| 4,795,296 A | 1/1989 | Jau | |
| 5,107,080 A * | 4/1992 | Rosen | 200/6 A |
| 5,450,054 A | 9/1995 | Schmersal | |
| 5,452,615 A | 9/1995 | Hilton | |
| 5,503,040 A | 4/1996 | Wright | |
| 5,589,828 A | 12/1996 | Armstrong | |
| 5,767,840 A | 6/1998 | Selker | |
| 6,081,257 A | 6/2000 | Zeller | |
| 6,160,537 A * | 12/2000 | Liu et al. | 345/161 |
| 6,433,772 B1 | 8/2002 | Krenz | |
| 6,580,418 B1 * | 6/2003 | Grome et al. | 345/161 |
| 2006/0053927 A1 | 3/2006 | Black | |
| 2010/0214223 A1 * | 8/2010 | Jackson et al. | 345/164 |

OTHER PUBLICATIONS

Bandera, P.; Buchele, P.; Rotational Joint Assembly and Method for Constructing the Same, Jun. 18, 2008.

* cited by examiner

*Primary Examiner* — Adam Tissot
(74) *Attorney, Agent, or Firm* — Ingrassia Fisher & Lorenz, P.C.

(57) ABSTRACT

A user input device for a vehicular electrical system is provided. The user input device includes a handle sized and shaped to be gripped by a human hand and a gimbal assembly within the handle. The gimbal assembly includes a first gimbal component, a second gimbal component coupled to the first gimbal component such that the second gimbal component is rotatable relative to the first gimbal component about a first axis, and a third gimbal component coupled to the second gimbal component such that the third gimbal component is rotatable relative to the second gimbal component about a second axis.

15 Claims, 10 Drawing Sheets

HAND CONTROLLER ASSEMBLY

STATEMENT REGARDING FEDERALLY SPONSORED RESEARCH OR DEVELOPMENT

This invention was made with Government support under Agreement No. NNJ06TA25C Subcontract No. RH6-118204 awarded by the National Aeronautics and Space Administration (NASA). The Government may have certain rights in this invention.

TECHNICAL FIELD

The present invention relates to user input devices, and more particularly, to a hand controller assembly.

BACKGROUND

Hand controllers are used as user input devices in a wide variety of applications, such as flight control devices and cursor control devices (CCD). Often the hand controllers are used in applications that receive input from along three axes. To receive such input, the hand controllers typically include multiple mechanical components moveably (e.g., rotationally) coupled to one another along with sensors configured to detect any such movements.

Conventionally, one or more of the pivot points between the components is located outside of (e.g., below) the handle, or grip, of the hand controller. As a result, a significant amount of arm movement is required by the user to actuate the hand controller in all of the axes of movement. Additionally, unintentional arm movements, such as those occurring in high-vibration or high g-force situations, such as those that may occur on-board an aircraft, may cause unwanted actuation of the hand controller. Further, such an assembly occupies a significant amount of space outside of the handle and requires complicated mechanisms if the hand controller is to provide an appropriate "feel" (e.g., stiffness) to the user.

The mechanical components are also often interconnected in such a way that movement of the hand controller in one of the axes causes some actuation in one or more of the other axes. As a result, relatively complex signal processing is often used to interpret the manual input applied by the user.

Accordingly, it is desirable to provide an improved hand controller assembly that addresses these, as well as other, issues. Furthermore, other desirable features and characteristics of the present invention will become apparent from the subsequent detailed description and the appended claims, taken in conjunction with the accompanying drawings and the foregoing technical field and background.

BRIEF SUMMARY

A user input device for a vehicular electrical system is provided. The user input device includes a handle sized and shaped to be gripped by a human hand and a gimbal assembly within the handle. The gimbal assembly includes a first gimbal component, a second gimbal component coupled to the first gimbal component such that the second gimbal component is rotatable relative to the first gimbal component about a first axis, and a third gimbal component coupled to the second gimbal component such that the third gimbal component is rotatable relative to the second gimbal component about a second axis. The rotation of the second gimbal component relative to the first gimbal component causes no rotation of the third gimbal component relative to the second gimbal component. The rotation of the third gimbal component relative to the second gimbal component causes no rotation of the second gimbal component relative to the first gimbal component.

A user input device for a vehicular electrical system is provided. The user input device includes a handle sized and shaped to be gripped by a human hand, and a controller assembly within the handle. The controller assembly includes a first component, a second component coupled to the first component such that the second component is rotatable relative to the first component about an axis between first, second, and third positions, the second position being located clockwise about the axis from the first position and the third position being located counterclockwise about the axis from the first position, and a flexure member interconnecting and applying a force to the first and second components, the force opposing said rotation of the second component relative to the first component in clockwise and counterclockwise directions about the axis. The flexure member is at least partially compressed when the second component is in each of the first, second, and third positions.

A flight control system for an aircraft is provided. The flight control system includes a flight control device. The flight control device includes a handle sized and shaped to be gripped by a human hand and a gimbal assembly within the handle. The gimbal assembly includes a first gimbal component, a second gimbal component coupled to the first gimbal component such that the second gimbal component is rotatable relative to the first gimbal component about a first axis, and a third gimbal component coupled to the second gimbal component such that the third gimbal component is rotatable relative to the second gimbal component about a second axis, wherein said rotation of the second gimbal component relative to the first gimbal component causes no rotation of the third gimbal component relative to the second gimbal component and said rotation of the third gimbal component relative to the second gimbal component causes no rotation of the second gimbal component relative to the first gimbal component, and at least one sensor coupled to the gimbal. The at least one sensor is configured to detect the rotations of the second and third gimbal components and generate device signals representative thereof. The flight control device also includes a controller in operable communication with the at least one sensor, the controller being configured to generate flight control signals in response to the device signals, an actuator in operable communication with the controller, the actuator being configured to actuate in response to the flight control signals, and a flight control surface coupled to the actuator such that said actuation of the actuator causes the flight control surface to move.

BRIEF DESCRIPTION OF THE DRAWINGS

The present invention will hereinafter be described in conjunction with the appended drawing figures, wherein like numerals denote like elements, and in which.

DETAILED DESCRIPTION

Figure 1:
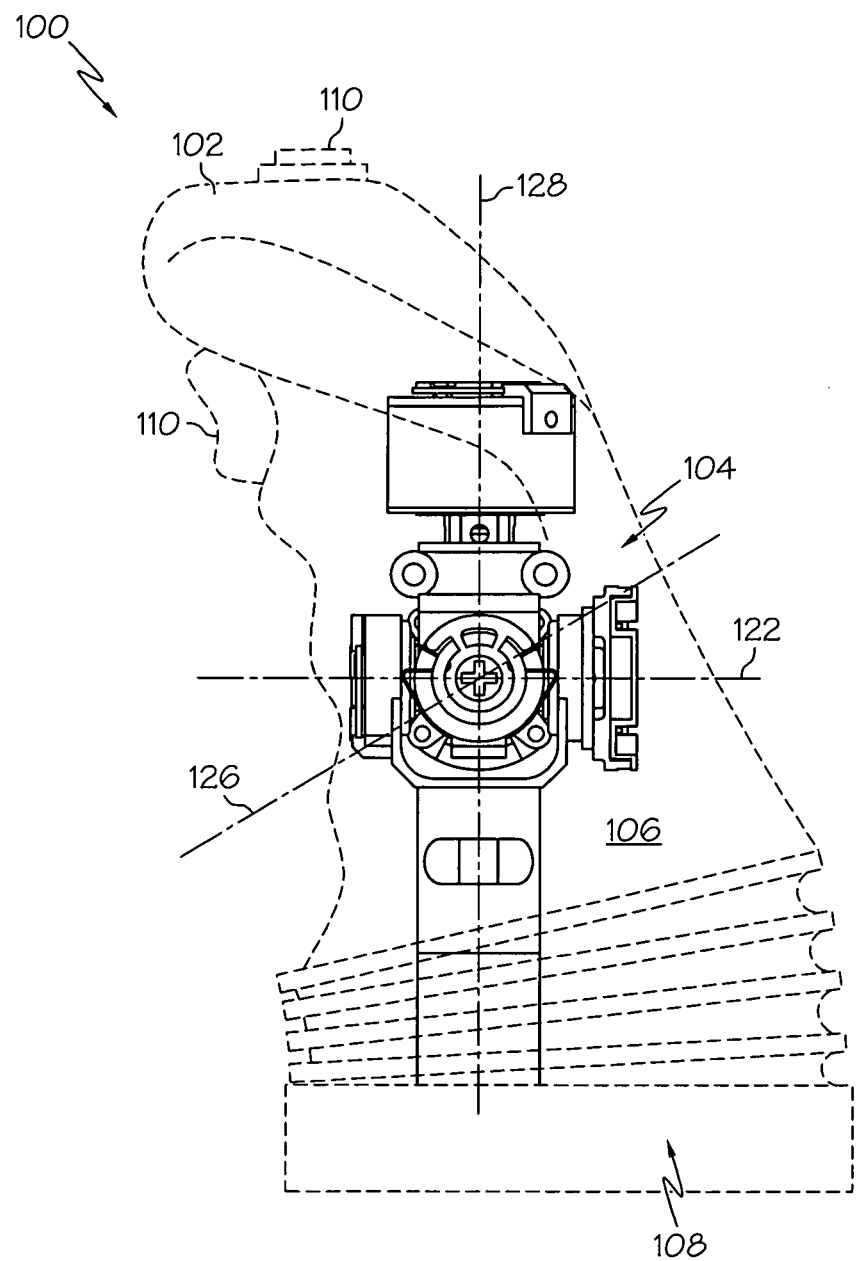
FIG. 1 is a transparent side view of a hand controller having a gimbal assembly therein, according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

It should be appreciated that the particular implementations shown and described herein are illustrative of the invention and its best mode and are not intended to otherwise limit the scope of the invention in any way. It should also be understood that FIGS. 1-13 are merely illustrative and may not be drawn to scale, and in several of the drawings, a Cartesian coordinate system, including x, y, and z (or pitch, roll, and yaw) axes and/or directions, is shown to clarify the relative orientation of the components, according to the various embodiments. However, this coordinate system is only intended to assist in the explanation of various aspects of the present invention, and should be not construed as limiting. Further, various components and features may be described as being "first," "second," "third," etc. However, these descriptors are used merely for convenience of description and should not be construed as limiting.

FIG. 1 to FIG. 13 illustrate user input devices for a vehicular electrical system. In one embodiment, a user input device includes a handle sized and shaped to be gripped by a human hand and a gimbal assembly within the handle. The gimbal assembly includes first, second, and third gimbal components. The second gimbal component is coupled to the first gimbal component such that the second gimbal component is rotatable relative to the first gimbal component about a first axis. The third gimbal component is coupled to the second gimbal component such that the third gimbal component is rotatable relative to the second gimbal component about a second axis. The rotation of the second gimbal component relative to the first gimbal component causes no rotation of the third gimbal component relative to the second gimbal component. The rotation of the third gimbal component relative to the second gimbal component causes no rotation of the second gimbal component relative to the first gimbal component.

In another embodiment, a user input device includes a handle sized and shaped to be gripped by a human hand, and a controller assembly within the handle. The controller assembly includes a first component, a second component coupled to the first component such that the second component is rotatable relative to the first component about an axis between first, second, and third positions, the second position being located clockwise about the axis from the first position and the third position being located counterclockwise about the axis from the first position, and a flexure member interconnecting and applying a force to the first and second components, the force opposing said rotation of the second component relative to the first component in clockwise and counterclockwise directions about the axis. The flexure member is at least partially compressed when the second component is in each of the first, second, and third positions.

FIG. 1 illustrates a hand controller (or user input device) 100, according to one embodiment of the present invention. The hand controller 100 includes a handle (or grip) 102 and a gimbal (or controller) assembly 104. The handle 102 is suitably sized and shaped to be gripped by a hand of a human (e.g., a user or pilot) and in one embodiment is substantially made of a flexible material, such as a rubber or foam-like material. In another embodiment, the handle is made of a rigid or stiff material, such as aluminum. The handle 102 is has a gimbal cavity 106 therein which opens through a gimbal opening 108 at a lower end of the handle 102. In the depicted embodiment, the handle 102 also includes two buttons 110 (e.g., a trigger button and a top button). The gimbal assembly 104 passes through the gimbal opening 108 and is located within the gimbal cavity 106. In FIG. 1, the hand controller 100 is shown with the handle 102 and gimbal assembly 104 in a centered, upright orientation (or position), to which it will return when not in use, according to one embodiment.

Figure 2:
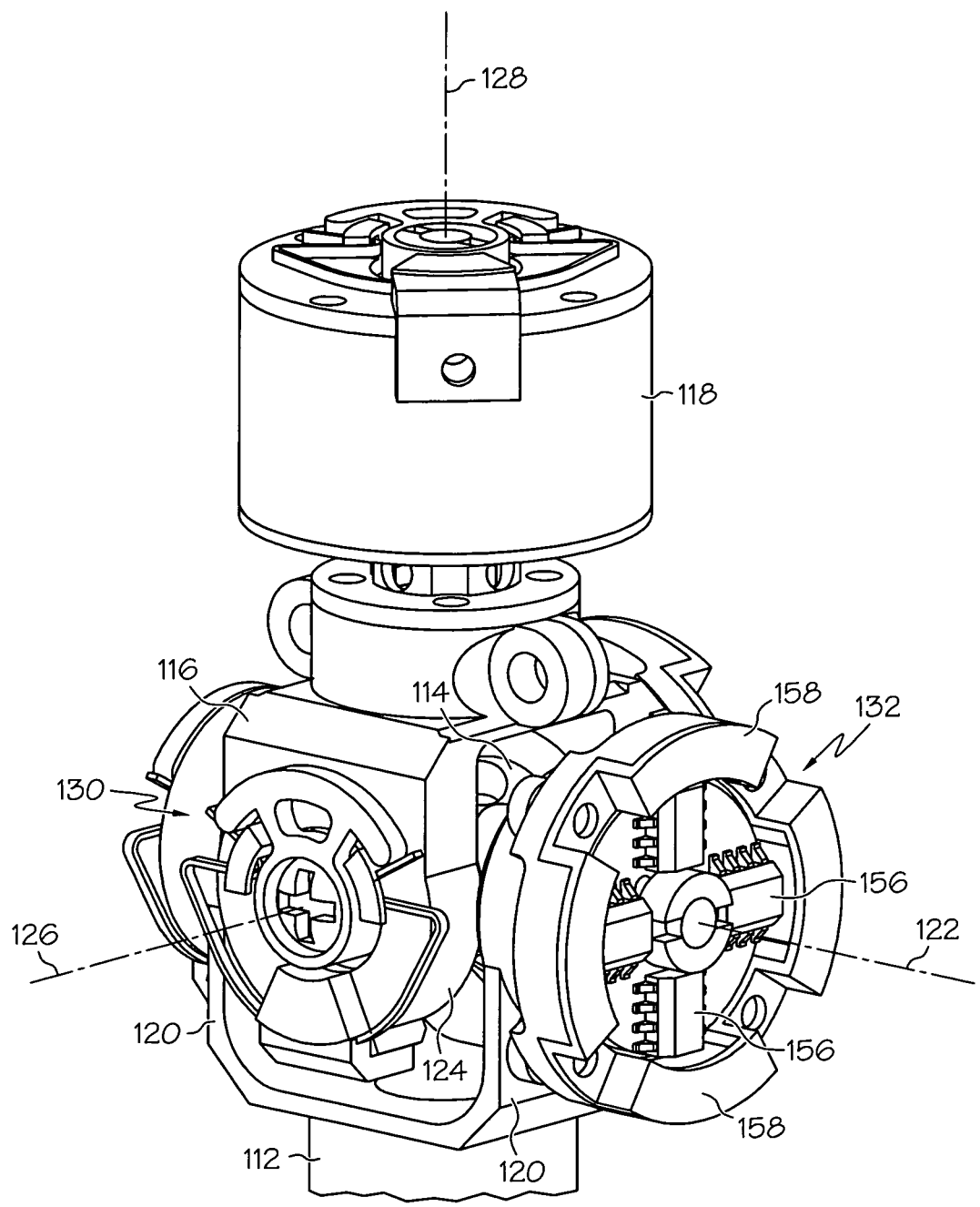
FIG. 2 is an isometric view of the gimbal assembly of FIG. 1.

FIG. 2 schematically illustrates the gimbal assembly 104 in greater detail. The gimbal assembly 104 includes a base (or first) component 112, a roll (or second) component 114, a pitch (or third) component 116, and a yaw (or fourth component) 118. The base component 112 is connected to the frame of the vehicle 10 through the gimbal opening 108 of the handle 102 (FIG. 1). In one embodiment, the base component 112 is fixed relative to the frame of the vehicle 10 (i.e., the base component 112 is not moveable relative to the frame). The base component 112 substantially has a "Y-shape" and includes two base attachment formations 120 on opposing sides and extending upwards from of an upper end thereof.

The roll component 114 has a substantially elongate shape and extends through the base attachment formations 120. The roll component 114 is coupled to the base attachment formations 120 such that the roll component 114 is rotatable about a first axis (e.g., the roll axis) 122.

The pitch component 116 substantially has a Y-shape and includes two pitch attachment formations 124 on opposing sides of a lower end thereof that extend downwards on opposing sides of a central portion of the roll component 114 between the base attachment formations 120. The pitch component 116 is coupled to the roll component 114 such that the pitch component 116 is rotatable about a second axis (e.g., the pitch axis) 126.

The yaw component 118, in the depicted embodiment, is cylindrical in shape and is coupled to an upper end of the pitch component 116 such that the yaw component 118 is rotatable about a third axis (e.g., the yaw axis) 128.

Of particular interest in the gimbal assembly 104 is that each of the roll, pitch, and yaw components 114, 116, and 118 are independently rotatable. That is, rotation of the roll component 114 (about the roll axis 122) relative to the base component 114 does not cause any rotation of the pitch component 116 relative to the roll component 114 or any rotation of the yaw component 118 relative to the pitch component 116. Likewise, rotation of the pitch component 116 (about the pitch axis 126) relative to the roll component 114 does not cause any rotation of the roll component 114 relative to the base component 114 or any rotation of the yaw component 118 relative to the pitch component 116. Similarly, rotation of the yaw component 118 (about the yaw axis 128) relative to the pitch component 116 does not cause any rotation of the roll component 114 relative to the base component 112 or any rotation of the pitch component 116 relative to the roll component 114. Additionally, as shown in FIG. 1, all of the axes 122, 126, and 128 about which the components 114, 116, and 118 rotate extend through the handle 102 and are mutually (or substantially mutually) orthogonal.

Referring again to FIG. 2, the gimbal assembly 104 also includes flexure assemblies 130 and sensor assemblies 132. As shown, one of the flexure assemblies 130 and one of the sensor assemblies 132 lie on opposing outer sides of the base attachment formations 120. Another of the flexure assemblies 130 and sensor assemblies 132 lie on opposing outer side of the pitch attachment formations 124. A third of the flexure assemblies 130 lies on an upper end of the yaw component 118, while a third of the sensor assemblies 132 (not shown) lies on a lower end of the yaw component 118.

Figure 3:
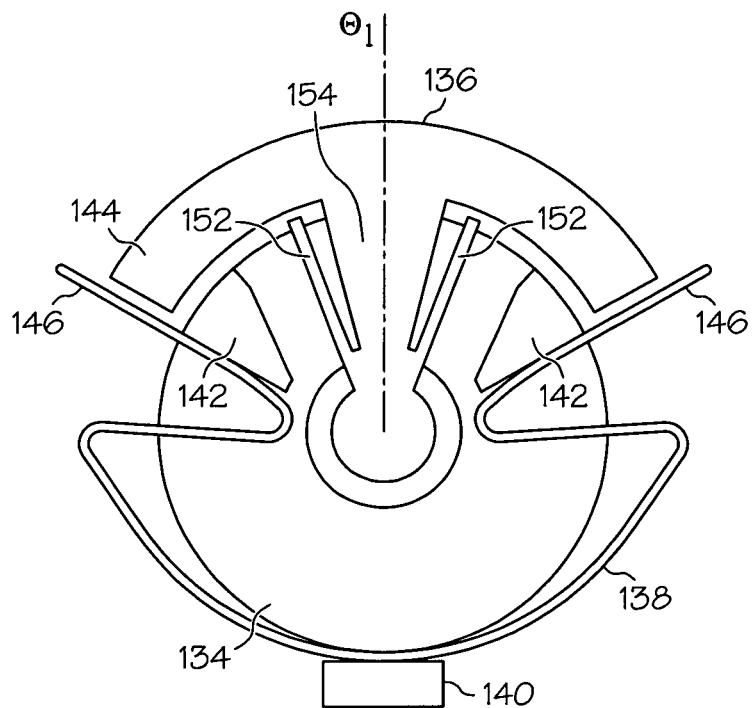
FIG. 3 is a plan view of a flexure assembly within the gimbal assembly of FIG. 2.

FIG. 3 illustrates one of the flexure assemblies 130 in greater detail. The flexure assembly 130 includes a fixed (or first) flexure assembly component 134, a moveable (or second) flexure assembly component 136, and a flexure member 138. The flexure assembly 130 shown in FIG. 3 may represent any of the flexure assemblies 130 shown in FIG. 2. If the flexure assembly 130 shown in FIG. 3 is the flexure assembly 130 adjacent to the base attachment formation 120 of the base component 112, the fixed component 134 is the base attachment formation 120 and the moveable component 136 is an armature rotationally fixed to the roll component 114. If the flexure assembly 130 shown in FIG. 3 is the flexure assembly 130 adjacent to the pitch attachment formation 124 of the pitch component 116, the fixed component 134 is the pitch attachment formation 124 and the moveable component 136 is an armature rotationally fixed to the roll component 114.

The fixed component 134 includes a flexure clamp 140 and two flexure stops 142 fixed thereto. In the depicted embodiment, the flexure clamp 140 is located at a bottom edge of the fixed component 134, and the flexure stops 142 are located on the fixed component 134 at approximately "10 o'clock" and "2 o'clock," respectively. The moveable component 136 has a curved outer portion 144 with ends angularly spaced in a manner similar to the flexure stops 142, as shown in FIG. 3.

In the depicted embodiment, the flexure member 138 is a symmetric, curved, and integral member made of a resilient metal, such as copper. The flexure member 138 is attached to the fixed component 134 at a central portion thereof by the flexure clamp 140 and has end portions 146 pressed against both the flexure stops 142 and opposing ends of the outer portion 144 of the moveable component 136. It should be understood that in other embodiments the flexure member may be different shapes, such as a triangle.

Figure 4:
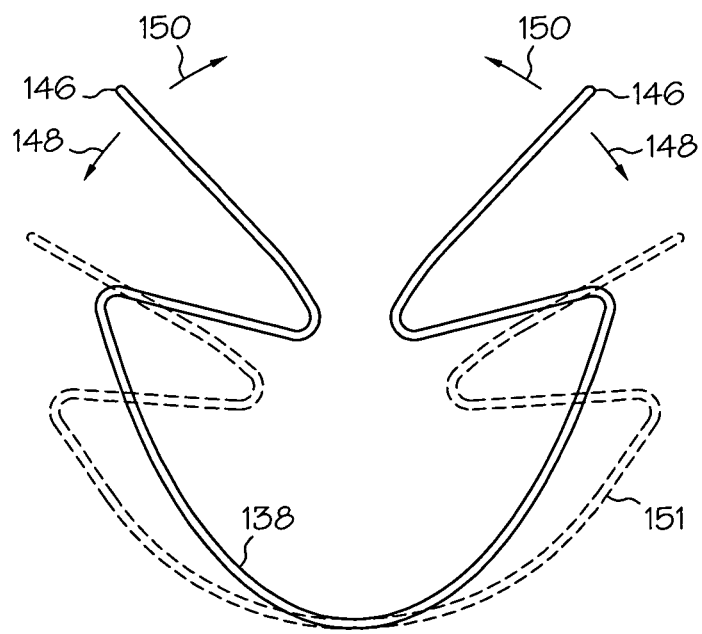
FIG. 4 is a plan view of a flexure member within the flexure assembly of FIG. 3.

FIG. 4 illustrates the flexure member 138 before installation into the flexure assembly 130. The flexure member 138 is deflectable in a first direction (indicated by arrows 148) and a second direction (indicated by arrows 150). The first direction 148 corresponds to the flexure member 138 being compressed, and the second direction corresponds to the flexure member 138 being expanded. FIG. 4 shows the flexure member 138 in its "unstressed" state (i.e., neither compressed nor expanded). As is apparent from a comparison of FIGS. 3 and 4, the flexure member 138 is compressed when installed in the flexure assembly 130, which is indicated by dashed line 151. As such, the flexure member 138 applies, in one embodiment, substantially equal and opposite forces onto the opposing ends of the outer portion 144 of the moveable component 136 (and/or the flexure stops 142) when the moveable component 136 is "centered" (in a first position ($\Theta_1$)) as shown in FIG. 3. In other embodiments, the forces applied to the opposing ends of the outer portion 144 may not be equal. For example, one side of the flexure member could be formed to have a greater thickness than the other side such that the user would feel a different stiffness when actuating the hand controller 100 in one direction compared to the opposing direction.

Still referring to FIG. 3, in one embodiment, the moveable component 136 also includes secondary (or inner) flexure members 152 extending substantially radially from opposing sides of an inner end of an inner portion 154 thereof. The secondary flexures 152 may be integrally formed and flexibly coupled to the moveable component 136. When the moveable component 136 is centered, neither of the secondary flexures 152 is in contact with the flexure stops 142.

Referring again to FIG. 2, the sensor assemblies 132, in one embodiment, each includes multiple magnetoresistive sensors 156 and magnets 158 configured to detect the relative rotation of the roll, pitch, and yaw components 114, 116, and 118 of the gimbal assembly 104. For example, within the sensor assembly 132 adjacent to one of the base attachment formation 120, the magnets 158 are fixed relative to the base attachment formation 120 and the magnetoresistive sensors 156 are rotationally fixed to the roll component 114. It should be understood that other types of sensors may also be used, such as Hall Effect sensors.

During operation, referring now to FIGS. 1 and 2, a user grips the handle 102 of the hand controller 100 and manually applies force or movement (i.e., input commands) thereto to operate the hand controller as a user input device. It should be understood that the hand controller 100 may be implemented as, for example, a flight control device 16 and/or a cursor control device 30 on-board the vehicle 10.

As described briefly above, the input commands supplied by the user cause the relative rotations of the components 114, 116, and 118 about the respective axes 122, 126, and 128 from which the sensor assemblies 132 generate control signals. However, the rotation of any one of the components 114, 116, and 118 does not cause any of the other components 114, 116, and 118 to rotate in such a way that a second control signal is generated by the gimbal assembly 104.

More specifically, for example, when the user tilts the handle 102 about the roll axis 122, the roll component 114 rotates about the roll axis 122 relative to the base component 112. This rotation is detected by the sensor assembly 132 adjacent to the base component 112, which generates a control signal representative thereof. However, the tilting of the handle 102 about the roll axis 122 also causes the pitch component 116 (and the pitch axis 126) and the yaw component 118 (and the yaw axis 128) to be rotated about the roll axis 122 with the roll component 114. Nevertheless, because the pitch component 116 has not rotated (i.e., about the pitch axis 126) relative to the roll component 114 and the yaw component 118 has not rotated (i.e., about the yaw axis 128) relative to the pitch component 116, the respective sensor assemblies 132 do not detect any rotation.

If the user then tilts the handle 102 about the pitch axis 126, the pitch component 116 rotates about the pitch axis 126 relative to the roll component 114, which is separately detected by the sensor assembly 132 adjacent to the pitch component 116 and a representative control signal is thereby generated.

FIGS. 5-8 illustrate one of the flexure assemblies 130 during the rotations of one of the components 114, 116, and 118 between various positions. For sake of clarity, the description below will refer only to the rotation of the moveable component 136 of the flexure assemblies 132 between the first position (FIG. 3) and second, third, fourth, and fifth positions. As is described below, the first position is angularly positioned between the second and third positions, the fourth position is between the first and second positions, and the fifth position is between the first and third positions. However, it should be understood that due to the interconnections between the gimbal components 114, 116, and 118 described above, the rotations shown in FIGS. 5-8 may demonstrate the operation of the flexure assembly 132 adjacent to any one of the base component 112, the pitch component 114, or the yaw component 118.

Figure 5:
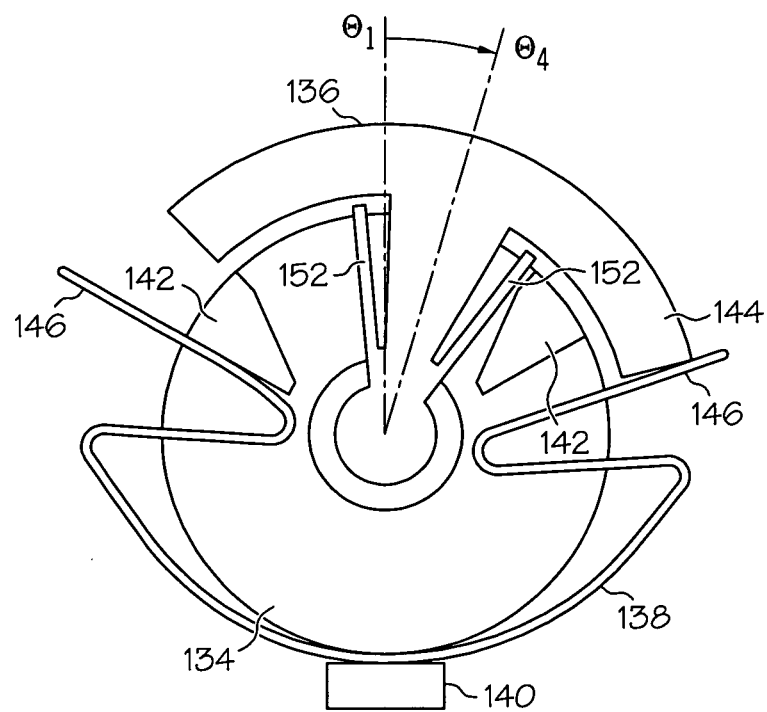
FIGS. 5-8 are plan views of the flexure assembly of FIG. 3 illustrating the operation thereof.

FIG. 5 illustrates the flexure assembly 130 with the moveable component 136 rotated clockwise to the fourth position ($\Theta_4$). As shown, the outer portion 144 of the moveable component 136 presses the end portion 146 of the flexure member 138 on the clockwise side away from the respective flexure stop 142, thus causing the flexure member 138 to be further compressed. Because the flexure member 138 is "pre-compressed" against the flexure stops 142, the flexure member 138 applies a force onto the outer portion 144 of the moveable component 136 that resists the rotation of the moveable component 136 (i.e., the force is applied in the counterclockwise direction) simultaneously with the beginning of the rotation.

Figure 6:
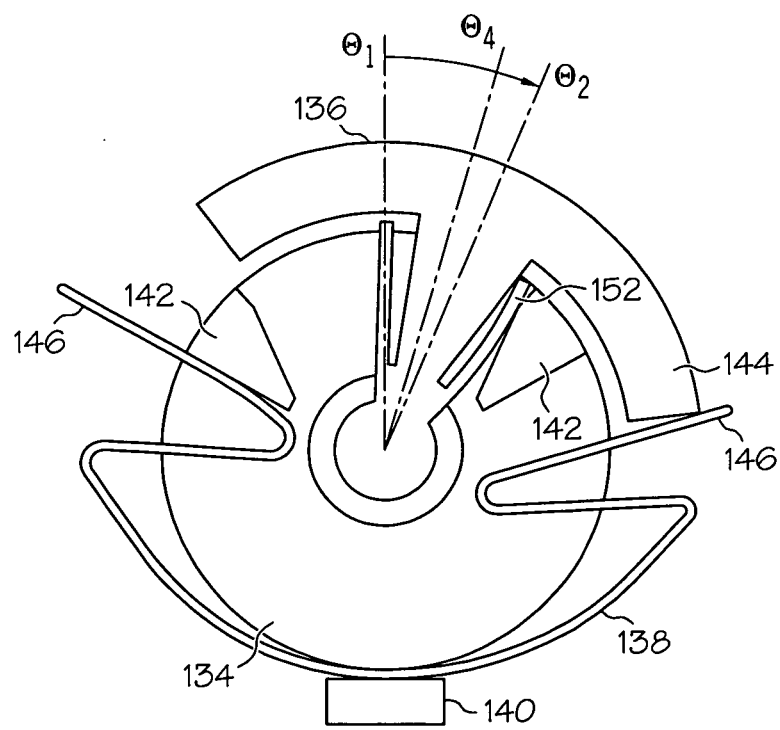

FIG. 6 illustrates the flexure assembly 130 with the moveable component 136 further rotated clockwise to the second position ($\Theta_2$). As shown, as the moveable component 136 continues to rotate, the respective secondary flexure member 152 is pressed against the respective flexure stop 142 and is compressed inwards. The compression of the secondary flexure member 152 causes an additional force to be applied onto the moveable component 136 that resists the rotation of the moveable component 136.

Thus, as the user causes the respective gimbal component to be rotated up to a first degree, the user feels a first resistive force, and as the user causes such rotation past the first degree, the user feels a second, increased resistive force. As such, the user feels a "soft-stop" (i.e., a point at which the resistive force increases) when he or she rotates one of the gimbal components 114, 116, and 118 to a degree sufficient to cause the secondary flexure members 152 to be compressed.

Figure 7:
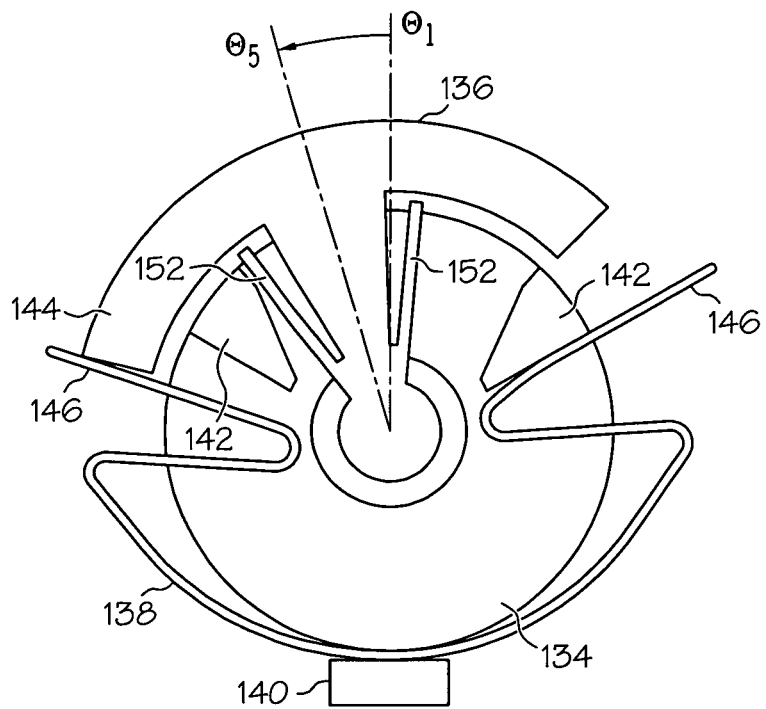
Figure 8:
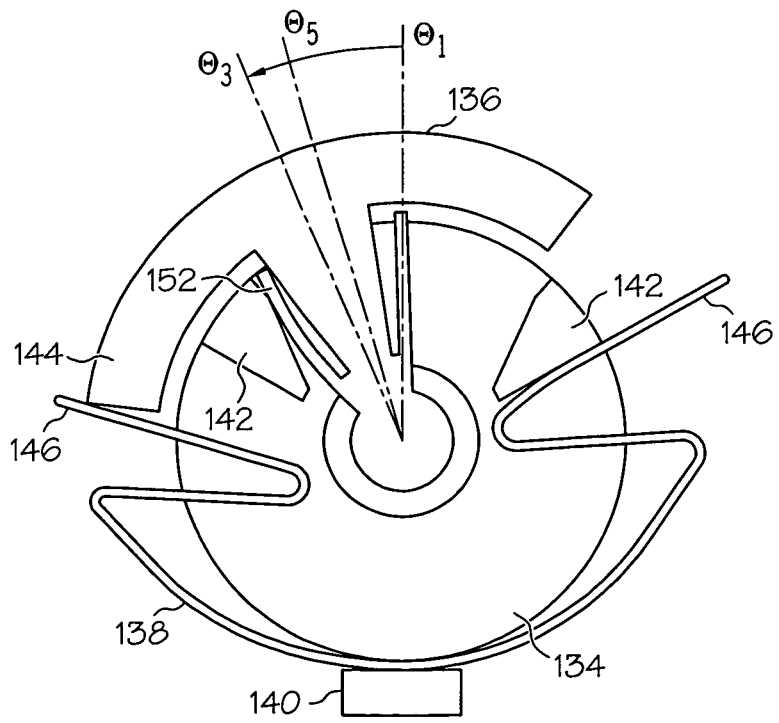

As illustrated in FIGS. 7 and 8, the flexure assembly 130 operates in a similar manner when the moveable component 136 is rotated in the opposite (e.g., counterclockwise) direction to the respective fifth ($\Theta_5$) and third ($\Theta_3$) positions. As such, the user feels similar first and second resistive forces when the user causes the respective gimbal component to be rotated, to first and second degrees, in the opposite direction. Additionally, although the moveable component 136 is rotated in the opposite (e.g., counterclockwise) direction, the flexure member 138 is further compressed as the respective end portion 146 of the flexure member 138 is pressed towards the flexure clamp. That is, the flexure member 138 undergoes additional compression when the moveable component 136 is rotated either clockwise or counterclockwise. Furthermore, because the flexure member 138 is pre-compressed against the flexure stops 142, the flexure member 138 never expands back to its unstressed orientation (FIG. 4).

In one embodiment, the resistive forces applied by the flexure member 138, as well as the secondary flexure members 152, within the flexure assemblies 130 are sufficient to cause moveable component 136 to return to the first position (FIG. 3) when the user releases the handle 102, which results in the respective gimbal components 114, 116, and 118 returning their respective centered positions, along with the handle 102 (as shown in FIG. 1). As such, the user will experience a "break-out" resistance when actuating the hand controller 100. That is, the resistive force is applied by the flexure assemblies 130, and is felt by the user, simultaneously with the beginning of actuation (as opposed to the resistive force being applied after the hand controller 100 is actuated slightly).

One advantage of the hand controller described above is that because all of the axes about which the various gimbal components rotate extend through the handle, the precision of the user's control is improved in several respects. First, the mass balance of the hand controller is improved. The amount of arm movement required to actuate the hand controller is also minimized. Additionally, the mechanical linkage between the user's hand and the pivot points is reduced. Further, the likelihood that the user will accidentally actuate the hand controller (e.g., in a high-vibration or high g-load situation) is reduced.

Another advantage is that because all three axes of rotation extend through the handle, the overall space required to house the rotational components is reduced. Additionally, because a single, integral flexure member is used, the number of parts required to provide the desired feel (i.e., stiffness), including the breakout torque, is minimized. Further, the simplicity of the secondary flexure members allows the soft-stop functionality to be provided with virtually no additional components. A yet further advantage is that because the flexure members remain compressed and never achieve their unstressed orientation, the amount of fatigue on the flexure members is reduced, greatly increasing the life of the mechanism. These benefits allow for the overall costs of implementing the hand controller to be minimized. Even further, because the gimbal components rotate completely independently, the signal processing used to interpret the actuations of the hand controller may be simplified.

Figure 9:
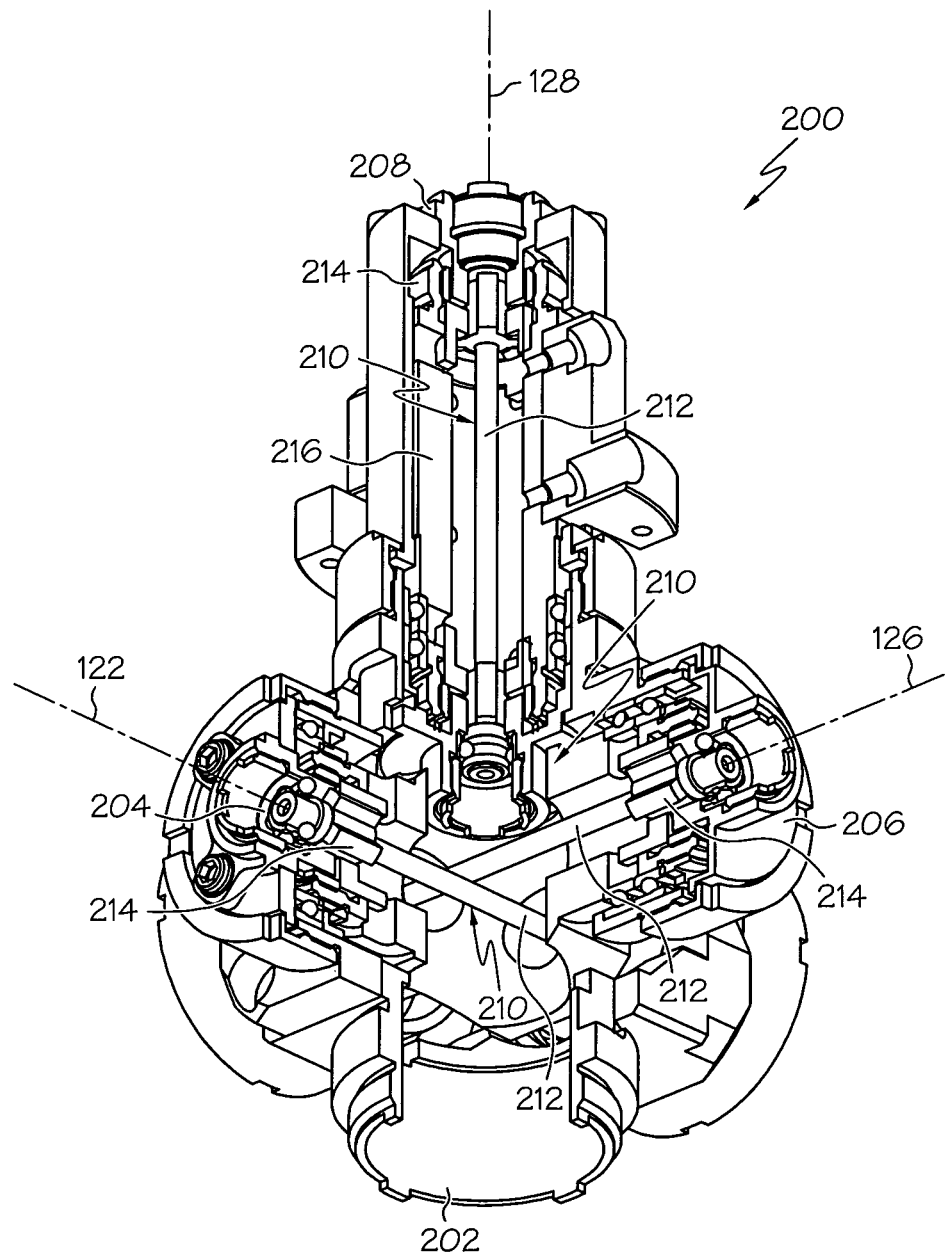
FIG. 9 is a cross-sectional, isometric view of a gimbal assembly, according to another embodiment of the present invention.

FIG. 9 illustrates, in a cross-sectional, isometric view, a gimbal (or controller) assembly 200, according to another embodiment of the present invention. Similar to the embodiment shown in FIG. 2, the gimbal assembly 200 includes a base component 202, a roll component 204, a pitch component 206, and a yaw component 208. The components 202, 204, 206, and 208 are rotationally coupled to one another in a fashion similar to that shown in FIG. 2. Specifically, the roll component 204 is rotatably coupled (i.e., rotatable about the roll axis 122) to the base component 202, the pitch component 206 is rotatably coupled (i.e., rotatable about the pitch axis 126) to the base component 202 (and/or the roll component 204), and the yaw component 208 is rotatably coupled (i.e., rotatable about the yaw axis 128) to the pitch component 206 (and/or the roll component 204 and/or the base component 202). Although not shown, the gimbal assembly 200 may include sensor assemblies similar to those described above. Also like the embodiment shown in FIG. 2, the components 204, 206, and 208 are interconnected such that the rotation of one component does not cause any detected rotation of another one of the components.

Of particular interest in the embodiment shown in FIG. 9, the gimbal assembly 200 also includes flexure assemblies 210, each extending substantially along a respective one of the axes 122, 126, and 128. Unlike the embodiment shown in FIG. 2, the flexure assemblies 210 are contained within the gimbal assembly 200 amongst the various components 202, 204, 206, and 208. Referring to FIG. 9 in combination with FIG. 10 (which schematically illustrates one of the assemblies 210), each of the flexure assemblies 210 includes a torsion bar (or flexure member) 212 and first and second stop rings 214 and 216. It should be understood that the flexure assembly 210 shown in FIG. 10 may be the flexure assembly 210 along any of the axes 122, 126, and 128 and may thus be associated with the relative rotation of any one of components 204, 206, and 208.

Figure 10:
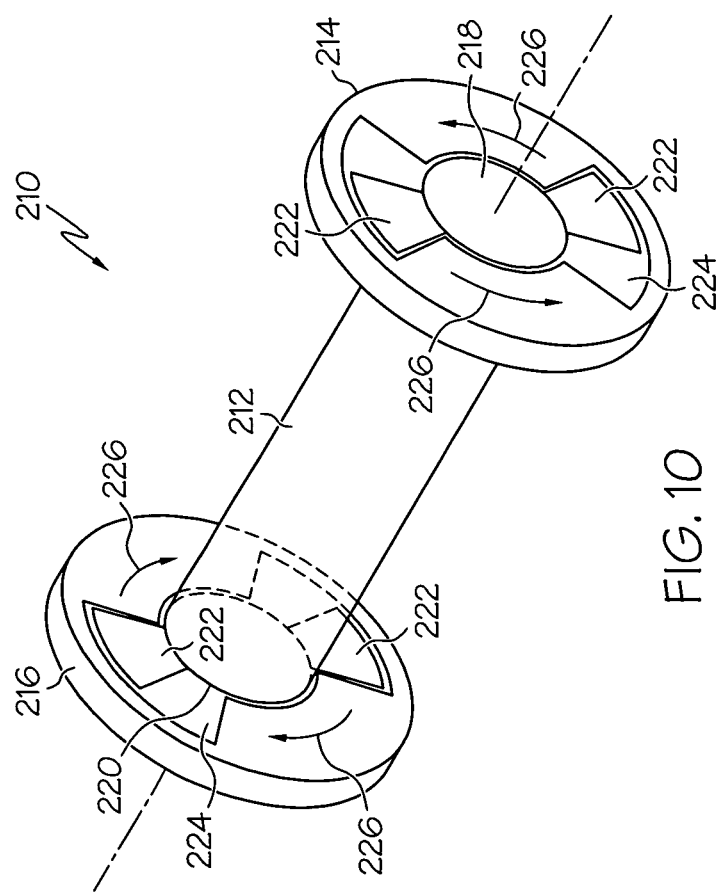
FIGS. 10-12 are isometric views of a flexure assembly within the gimbal assembly of FIG. 9 illustrating the operation thereof.
Figure 11:
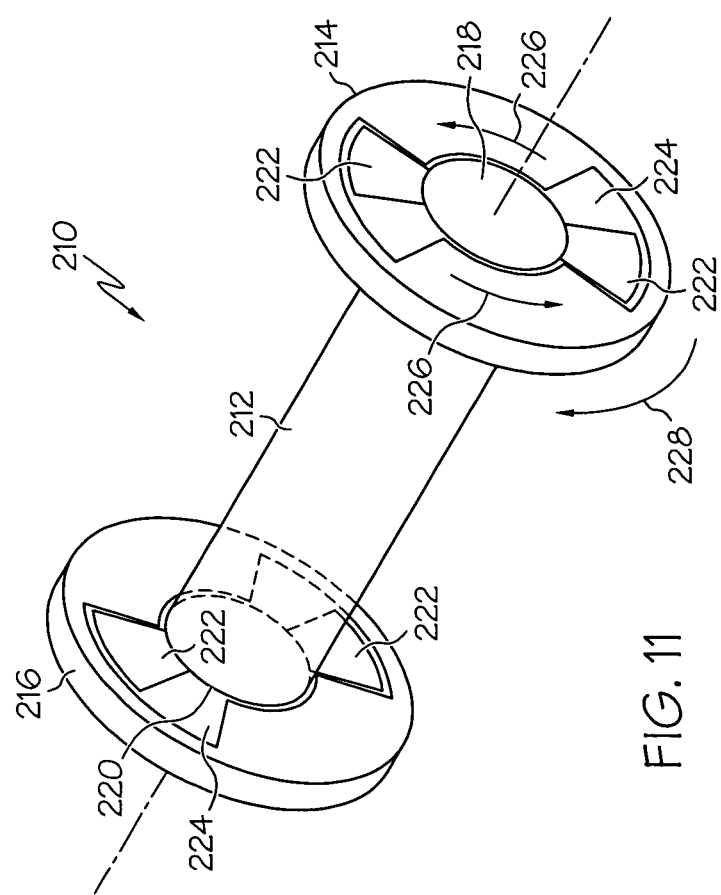
Figure 12:
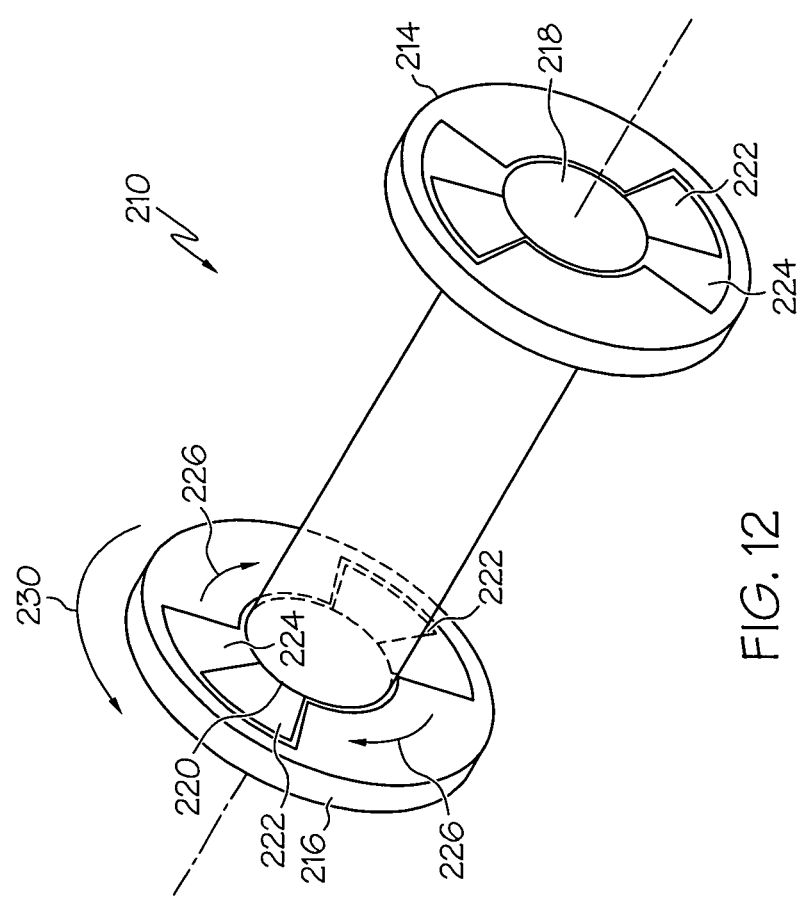

The torsion bar 212 has first and second opposing ends 218 and 220 with engagement formations 222 extending therefrom and is made of, for example, a flexible, resilient steel alloy including iron, nickel, cobalt, chromium, molybdenum, and carbon, such as AERMET-100 available from Carpenter Technology Corporation of Wyomissing, Pa., U.S.A. The stop rings 214 and 216 include "keyholes" 224 extending therethrough. The torsion bar 212 and the stop rings 214 and 216 are arranged such that the opposing ends 218 and 220 of the torsion bar 212 extend through the keyholes 224 of the stop rings 214 and 216. In particular, the engagement formations 222 are mated with the keyholes 224 as shown in FIG. 10. It should be noted that in at least one embodiment, the stop rings 214 and 216 are in a fixed position and orientation relative to the remainder of the gimbal assembly 200.

Before installation into the gimbal assembly 200, the torsion bar 212 is twisted, or "pre-loaded," such that when the opposing ends 218 and 220 are mated with the stop rings 214 and 216, respectively, the engagement formations 222 exert a torque onto the stops rings 214 and 216 as indicated by arrows 226. Although not illustrated, but as will be appreciated by one skilled in the art, the torsion bar 212 is coupled to the respective component (e.g., the roll component 204) such that only one of the ends 218 and 220 of the torsion bar 212 is rotated, or twisted, when the respective component is rotated about its respective axis (e.g., the roll axis 122). For example, referring to FIG. 11, when the respective component is rotated in a first direction 228 (e.g., clockwise), only the first end 218 of the torsion bar 212 is twisted in the first direction 228. Likewise, referring to FIG. 12, when the respective component in rotated in a second direction 230 (e.g., counterclockwise), only the second end 220 of the torsion bar 212 is twisted in the second direction 230.

As such, when the respective component is twisted in either direction, the torsion bar 212 is twisted in such a way that opposes the pre-load torque described above such that the total torque exerted on the torsion bar 212 is increased. Thus, the user experiences a resistive torque when actuating the hand controller, in a way similar to the embodiment shown in FIG. 2. Additionally, because the torsion bar 212 is pre-loaded and the rotation of the respective component in either direction causes the torsion bar 212 to be twisted in such a way that opposes the pre-loaded torque, the torsion bar 212 never achieves its unstressed orientation, similar to the flexure member 138 in FIGS. 3-8. It should be noted that, in FIGS. 11 and 12, the rotation of the ends 218 and 220 of the torsion bar 212, and thus the respective component of the gimbal assembly 200, may be limited by the relative widths of the keyholes 224 and the engagement formations 222.

Figure 13:
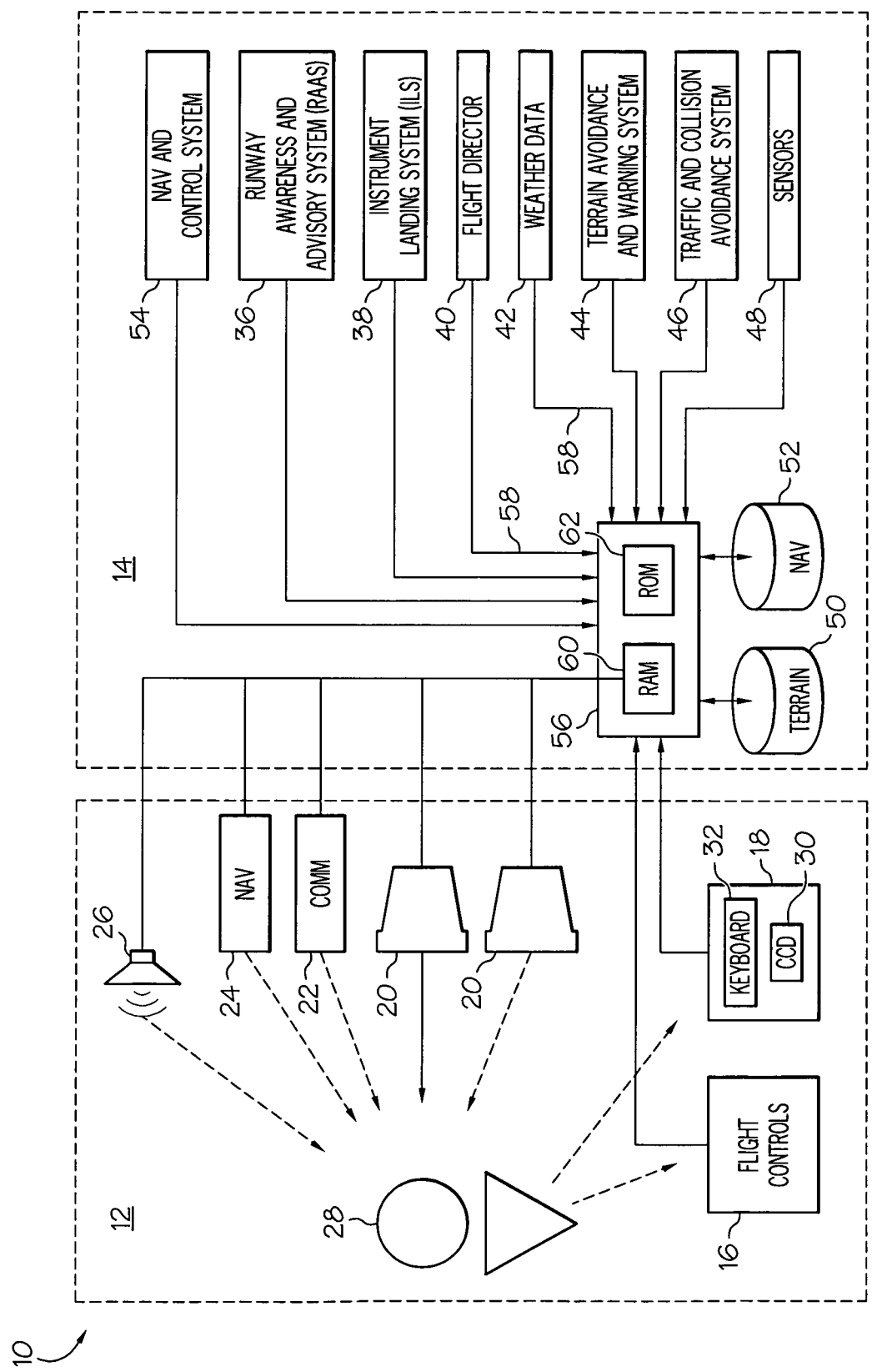
FIG. 13 is a block diagram schematically illustrating a vehicle including a flight deck and an avionics/flight system.

FIG. 13 schematically illustrates a vehicle 10, such as an aircraft, according to one embodiment of the present invention, in which the hand controller described above may be implemented. The vehicle 10 may be, in one embodiment, any one of a number of different types of aircraft such as, for example, a spacecraft, a private propeller or jet engine driven airplane, a commercial jet liner, or a helicopter. In the depicted embodiment, the vehicle 10 includes a flight deck 12 (or cockpit) and an avionics/flight system 14. Although not specifically illustrated, it should be understood that the vehicle 10 also includes a frame or body to which the flight deck 12 and the avionics/flight system 14 are connected, as is commonly understood. It should also be noted that vehicle 10 is merely exemplary and could be implemented without one or more of the depicted components, systems, and data sources. It will additionally be appreciated that the vehicle 10 could be implemented with one or more additional components, systems, or data sources.

In one embodiment, the flight deck 12 includes flight controls (or flight control devices) 16, a computing system interface 18, display devices 20 (e.g., a primary flight display (PFD)), a communications radio 22, a navigational radio 24, and an audio device 26. In one embodiment, the flight controls 16 may include, for example, a hand controller (e.g., as described above) and foot pedals configured to receive input commands from a user (e.g., a pilot) 28. The computing system interface 18 is configured to receive input from the user 28 and, in response to the user input, supply command signals to the avionics/flight system 14. The computing system interface 18 may include any one, or combination, of various known user interface devices including, but not limited to, a cursor control device (CCD) 30, such as a hand controller (e.g., as described above), a mouse, a trackball, or joystick, and/or a keyboard, one or more buttons, switches, or knobs. In the depicted embodiment, the computing system interface 18 includes a CCD 30 and a keyboard 32. The user 28 uses the CCD 30 to, among other things, move a cursor symbol on the display devices 20, and may use the keyboard 32 to, among other things, input textual data.

Still referring to FIG. 1, the display devices 20 are each used to display various images and data, in graphic, iconic, and/or textual formats, and to supply visual feedback to the user 28 in response to user input commands supplied by the user 28 to the computing system interface 18. It will be appreciated that the display devices 20 may each be implemented using any one of numerous known displays suitable for rendering image and/or text data in a format viewable by the user 28, such as a cathode ray tube (CRT) displays, a LCD (liquid crystal display), a TFT (thin film transistor) displays, or a heads up display (HUD) projection.

The communication radio 22 is used, as is commonly understood, to communicate with entities outside the vehicle 10, such as air-traffic controllers and pilots of other aircraft. The navigational radio 24 is used to receive from outside sources and communicate to the user various types of information regarding the location of the vehicle, such as Global Positioning Satellite (GPS) system and Automatic Direction Finder (ADF) (as described below). The audio device 26 is, in one embodiment, an audio speaker mounted within the flight deck 12.

The avionics/flight system 14 includes a runway awareness and advisory system (RAAS) 36, an instrument landing system (ILS) 38, a flight director 40, a weather data source 42, a terrain avoidance warning system (TAWS) 44, a traffic and collision avoidance system (TCAS) 46, a plurality of sensors 48, one or more terrain databases 50, one or more navigation databases 52, a navigation and control system 54, and a processor 56. The various components of the avionics/flight system 14 are in operable communication via a data bus 58 (or avionics bus).

The RAAS 36 provides improved situational awareness to help lower the probability of runway incursions by providing timely aural advisories to the flight crew during taxi, takeoff, final approach, landing and rollout. The ILS 38 is a radio navigation system that provides aircraft with horizontal and vertical guidance just before and during landing and, at certain fixed points, indicates the distance to the reference point of landing. The flight director 40, as is generally known, supplies command data representative of commands for piloting the aircraft in response to flight crew entered data, or various inertial and avionics data received from external systems. The weather data source 42 provides data representative of at least the location and type of various weather cells. The TAWS 44 supplies data representative of the location of terrain that may be a threat to the aircraft, and the TCAS 46 supplies data representative of other aircraft in the vicinity, which may include, for example, speed, direction, altitude, and altitude trend. Although not illustrated, the sensors 48 may include, for example, a barometric pressure sensor, a thermometer, and a wind speed sensor.

The terrain databases 50 include various types of data representative of the terrain over which the aircraft may fly, and the navigation databases 52 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information.

The navigation and control system 54 may include a flight management system (FMS), a control display unit (CDU), an autopilot or automated guidance system, multiple flight control surfaces (e.g., ailerons, elevators, and a rudder), an Air Data Computer (ADC), an altimeter, an Air Data System (ADS), a Global Positioning Satellite (GPS) system, an automatic direction (ADF), a compass, at least one engine, and gear (i.e., landing gear).

The processor 56 may be any one of numerous known general-purpose microprocessors or an application specific processor that operates in response to program instructions. In the depicted embodiment, the processor 56 includes on-board random access memory (RAM) 60 and on-board read only memory (ROM) 62. The program instructions that control the processor 56 may be stored in either or both the RAM 60 and the ROM 62. For example, the operating system software may be stored in the ROM 62, whereas various operating mode software routines and various operational parameters may be stored in the RAM 60. It will be appreciated that this is merely exemplary of one scheme for storing operating system software and software routines, and that various other storage schemes may be implemented. It will also be appreciated that the processor 56 may be implemented using various other circuits, not just a programmable processor. For example, digital logic circuits and analog signal processing circuits could also be used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A user input device for a vehicular electrical system comprising:
   a handle sized and shaped to be gripped by a human hand; and
   a gimbal assembly within the handle, the gimbal assembly comprising:
      a first gimbal component;
      a second gimbal component coupled to the first gimbal component such that the second gimbal component is rotatable relative to the first gimbal component about a first axis; and
      a third gimbal component coupled to the second gimbal component such that the third gimbal component is rotatable relative to the second gimbal component about a second axis,
      wherein said rotation of the second gimbal component relative to the first gimbal component causes no rotation of the third gimbal component relative to the second gimbal component and said rotation of the third gimbal component relative to the second gimbal component causes no rotation of the second gimbal component relative to the first gimbal component.

2. The user input device of claim 1, wherein the gimbal assembly further comprises a fourth gimbal component coupled to the third gimbal component such that the fourth gimbal component is rotatable relative to the third gimbal component about a third axis, and wherein said rotation of the fourth gimbal component relative to the third gimbal component causes no rotation of the third gimbal component relative to the second gimbal component.

3. The user input device of claim 2, wherein said rotation of the fourth gimbal component relative to the third gimbal component causes no rotation of the second gimbal component relative to the first gimbal component.

4. The user input device of claim 3, wherein the first, second, and third axes are substantially mutually orthogonal.

5. The user input device of claim 4, wherein the fourth gimbal component is coupled to the third gimbal component such that said rotation of the third gimbal component causes the fourth gimbal component to rotate about the second axis with the third gimbal component.

6. The user input device of claim 5, wherein the third gimbal component is coupled to the second gimbal component such that said rotation of the second gimbal component causes the third and fourth gimbal components to rotate about the first axis with the second gimbal component.

7. The user input device of claim 6, wherein said rotation of the third gimbal component causes the third axis to rotate about the second axis, and said rotation of the second gimbal component causes the second and third axes to rotate about the first axis.

8. The user input device of claim 7, wherein the gimbal assembly is coupled to a grip portion of the handle such that manipulation of the grip portion of the handle causes said rotations of the second, third, and fourth gimbal components.

9. The user input device of claim 8, wherein the gimbal assembly further comprises:
   a first flexure member interconnecting and applying a first force to the first and second gimbal components, the first force opposing said rotation of the second gimbal component relative to the first gimbal component about the first axis;
   a second flexure member interconnecting and applying a second force to the second and third gimbal components, the second force opposing said rotation of the third gimbal component relative to the second gimbal component about the second axis; and
   a third flexure member interconnecting and applying a third force to the third and fourth gimbal components, the third force opposing said rotation of the fourth gimbal component relative to the third gimbal component about the third axis.

10. The user input device of claim 9, wherein the first, second, and third flexure members apply the respective first, second, and third forces in clockwise and counterclockwise directions about the respective first, second, and third axes and always interconnect the respective gimbal components in an at least partially compressed manner.

11. A flight control system for an aircraft comprising:
   a flight control device comprising:
      a handle sized and shaped to be gripped by a human hand;
      a gimbal assembly within the handle, the gimbal assembly comprising:
      a first gimbal component;

a second gimbal component coupled to the first gimbal component such that the second gimbal component is rotatable relative to the first gimbal component about a first axis; and a third gimbal component coupled to the second gimbal component such that the third gimbal component is rotatable relative to the second gimbal component about a second axis, wherein said rotation of the second gimbal component relative to the first gimbal component causes no rotation of the third gimbal component relative to the second gimbal component and said rotation of the third gimbal component relative to the second gimbal component causes no rotation of the second gimbal component relative to the first gimbal component; and at least one sensor coupled to the gimbal, the at least one sensor being configured to detect said rotations of the second and third gimbal components and generate device signals representative thereof, a controller in operable communication with the at least one sensor, the controller being configured to generate flight control signals in response to the device signals;

an actuator in operable communication with the controller, the actuator being configured to actuate in response to the flight control signals; and a flight control surface coupled to the actuator such that said actuation of the actuator causes the flight control surface to move.

12. The flight control system of claim 11, wherein the gimbal assembly further comprises:

a first flexure member interconnecting and applying a force to the first and second components, the force opposing said rotation of the second component relative to the first component in clockwise and counterclockwise directions about the first axis; and a second flexure member interconnecting and applying a force to the second and third components, the force opposing said rotation of the third component relative to the second component in clockwise and counterclockwise directions about the second axis.

13. The flight control system of claim 12, wherein the second and third components are rotatable between first, second, and third positions, the second position being located clockwise about the respective axis from the first position and the third position being located counterclockwise about the respective axis from the first position, and wherein the first and second flexure members are at least partially compressed when the second and third components are in each of the first, second, and third positions.

14. The flight control system of claim 13, wherein the gimbal assembly further comprises a fourth gimbal component coupled to the third gimbal component such that the fourth gimbal component is rotatable relative to the third gimbal component about a third axis, and wherein said rotation of the fourth gimbal component relative to the third gimbal component causes no rotation of the third gimbal component relative to the second gimbal component and said rotation of the fourth gimbal component relative to the third gimbal component causes no rotation of the second gimbal component relative to the first gimbal component.

15. The flight control system of claim 14, wherein the first, second, and third axes are substantially mutually orthogonal.

* * * * *